United States Patent [19]

Houck et al.

[11] Patent Number: 5,689,251

[45] Date of Patent: Nov. 18, 1997

[54] AIRSPEED PREDICTION FILTER

[75] Inventors: Andrew W. Houck, Woodinville; Melville D. W. McIntyre, Bellevue, both of Wash.

[73] Assignee: The Boeing Company, Seattle, Wash.

[21] Appl. No.: 715,350

[22] Filed: Aug. 30, 1996

[51] Int. Cl.$^6$ ....................................... G01C 21/00
[52] U.S. Cl. .................................. 340/978; 340/969
[58] Field of Search .......................... 340/978, 973, 340/969, 963; 73/170.07, 170.11, 178 T; 364/424.026, 424.06, 424.016; 116/62.1

[56] References Cited

U.S. PATENT DOCUMENTS

| | | | |
|---|---|---|---|
| 4,163,387 | 8/1979 | Schroeder | 340/973 X |
| 5,349,347 | 9/1994 | Muller | 340/969 |
| 5,361,065 | 11/1994 | Johnson et al. | 340/968 |
| 5,493,293 | 2/1996 | Hansen et al. | 340/969 X |

*Primary Examiner*—Jeffery Hofsass
*Assistant Examiner*—Anh La
*Attorney, Agent, or Firm*—Christensen O'Connor Johnson & Kindness

[57] ABSTRACT

An air data computer outputs a data stream indicative of measured airspeed of an aircraft, for use in generating a display of airspeed to a pilot. To correct for the inherent processing delay, a correction factor is added to the data stream, so that the display is more closely related to the actual airspeed of the aircraft at the time of the display. The correction factor can be calculated by determining the average rate of change of airspeed during a preceding time interval and multiplying the average rate of change by the processing delay.

9 Claims, 9 Drawing Sheets

AIRSPEED PREDICTION FILTER

FIELD OF THE INVENTION

The present invention relates to an improved system for displaying the airspeed of an aircraft to a pilot.

BACKGROUND OF THE INVENTION

For modern commercial aircraft, it is important that the pilot have an accurate display of airspeed, particularly during the takeoff roll. At a specific predetermined airspeed, the pilot must make a "go, no-go" decision. This speed is referred to as the takeoff decision speed or V1. It is calculated based on aircraft weight, thrust setting, runway length and slope, altitude, flap setting, and other factors that affect the ability to stop the airplane safely before reaching the end of the runway.

The V1 calculations printed in the aircraft flight manual assume that the current airspeed displayed to the pilot is accurate and does not suffer from any time delay. If the displayed airspeed lags behind the actual airspeed, it will require a longer distance to stop the aircraft from the perceived V1 speed. To maximize payload, accuracy and timing of the airspeed display is crucial. Otherwise, safety will dictate a "performance penalty" in terms of reduced payload to ensure a safe takeoff-abort decision at V1.

In older commercial aircraft, airspeed was displayed on round-dial, mechanical instruments. A pressure-sensing diaphragm drove a rotating needle through connecting rods and precision gears. The mechanical inertia of the moving parts introduced a smoothing effect, and thus the needle would not exhibit noticeable jitter in turbulent air conditions. This smoothing effect did introduce a small time delay in the displayed airspeed, typically a few tenths of a second, but because the delay was small (or, more correctly, because no one recognized its effect), it was neglected when the V1 speeds were calculated. In modem aircraft, on the other hand, solid-state pressure sensors are used to compute airspeed for presentation on large electronic displays. They present the airspeed in a vertical tape format. A characteristic of this format is that the airspeed is displayed with much finer resolution than it was on the old round-dial instruments. Consequently, much more smoothing is required to avoid objectionable jitter. The smoothing is performed in software, using a digital filter.

FIG. 1 illustrates a block diagram of a modem avionics display having an airspeed sensor 10 that outputs a digital data stream $x(n)$. The air data computer 12 incorporates a digital filter 14 of the type shown in FIG. 2 to smooth the data sufficiently that unacceptable jitter does not occur. The filter equation is as follows:

$$y(n)=b \cdot x(n)+a \cdot y(n-1) \tag{1}$$

More specifically, the smooth airspeed indication $y(n)$ for each sample $n$ is obtained by multiplying the incoming sample $x(n)$ by a constant $b$ and adding the product to a constant $a$ multiplied by the indication obtained for a preceding sample $y(n-1)$. The sum of constants $b$ and $a$ should be 1. The higher the value of $b$, the more reactive the filter is to the immediate sample, but the less the filter will be effective to remove jitter. In a representative embodiment at an iteration rate of 20 Hz, $b=0.05$ add $a=0.95$. Thus, the $y(n)$ output is the sum of 5% of the current sample and 95% of the preceding value.

The time delay introduced by the filter, when added to other computational delays in the system, can be well in excess of a second, way too much to ignore. The additional distance required to stop the aircraft from the displayed V1 speed can be as much as 400 feet more than the distance required from the actual V1 speed. Commercial airplane manufacturers have only recently recognized the impact this delay has on takeoff performance, and measures must be taken either to remove the delay or take significant performance penalties.

SUMMARY OF THE INVENTION

The present invention provides an improved system for indicating airspeed to a pilot of a commercial aircraft having a computerized electronic display system. In the preferred embodiment, a second order infinite input response (IIR) filter samples the incoming airspeed data stream ($x(n)$) from an air data computer. The resulting smoothed airspeed data ($y(n)$) is then combined with a correction factor to predict the actual airspeed of the aircraft at the instant it is displayed to the pilot. Preferably, the correction factor is determined solely from the rate of change of the filtered airspeed. More specifically, the correction factor is determined by calculating the average rate of change of airspeed during a fixed time interval (a moving window of time) prior to the present time. That average rate of change is multiplied by the total time delay in the original airspeed signal and then added to that signal in order to project it forward to the present time. Thus, the effect of the time delay is compensated precisely. The result is an acceptably smooth display of airspeed which is much more closely related to the actual airspeed of the aircraft. As a precaution, upper and lower limits can be set for the correction factor, corresponding to the maximum acceleration and deceleration to be expected for the aircraft.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides an improved system for indicating airspeed to a pilot. More specifically, the present invention takes into consideration the known delay introduced by a computerized electronic display system and "predicts" the actual airspeed at the instant of display to the pilot.

The first component of the filter 20 in accordance with the present invention is a second order IIR filter 22 for which the filter equation is as follows:

$$y(n)=b_0 \cdot x(n)+b_1 \cdot x(n-1)+b_2 \cdot x(n-2)+a_1 \cdot y(n-1)+a_2 \cdot y(n-2) \quad (2)$$

The output y(n) is referred to herein as the "calculated airspeed." It is obtained by multiplying the current sample x(n) from the air data computer by a constant $b_0$ and adding the product to the following four other factors: the preceding sample x(n−1) times a constant $b_1$; the next earlier sample x(n−2) times a constant $b_2$; the calculated airspeed determined for the preceding sample y(n−1) times a constant $a_1$; and the calculated airspeed for the next earlier sample y(n−2) times a constant $a_2$. Constants $b_0$, $b_1$, $b_2$, $a_1$, and $a_2$ are selected to obtain the desired smoothing of the filter output as compared to the input samples x(n). These values also may be affected by the filter sample rate which, in the preferred embodiment, is 20 Hz, but a sampling rate of 15 Hz or higher would be acceptable. At a sampling rate of 20 Hz the preferred filter coefficients are as follows:

$b_0 = 0.0126$
$b_1 = 0.0253$
$b_2 = 0.0126$
$a_1 = 1.6200$
$a_2 = -0.6705$

These values result in a digital implementation of a second order Butterworth filter. By using a second order IIR filter as compared to the filters previously used, the same degree of smoothing of the airspeed data stream from the air data computer can be obtained with less processing delay. In tests conducted for the Boeing 777-200 aircraft, it was found that total processing delay from the probe to the cockpit display could be reduced from more than 1 second to about 0.7 second by changing from the prior art filter to a second order IIR filter of the type described above.

Figure 3:
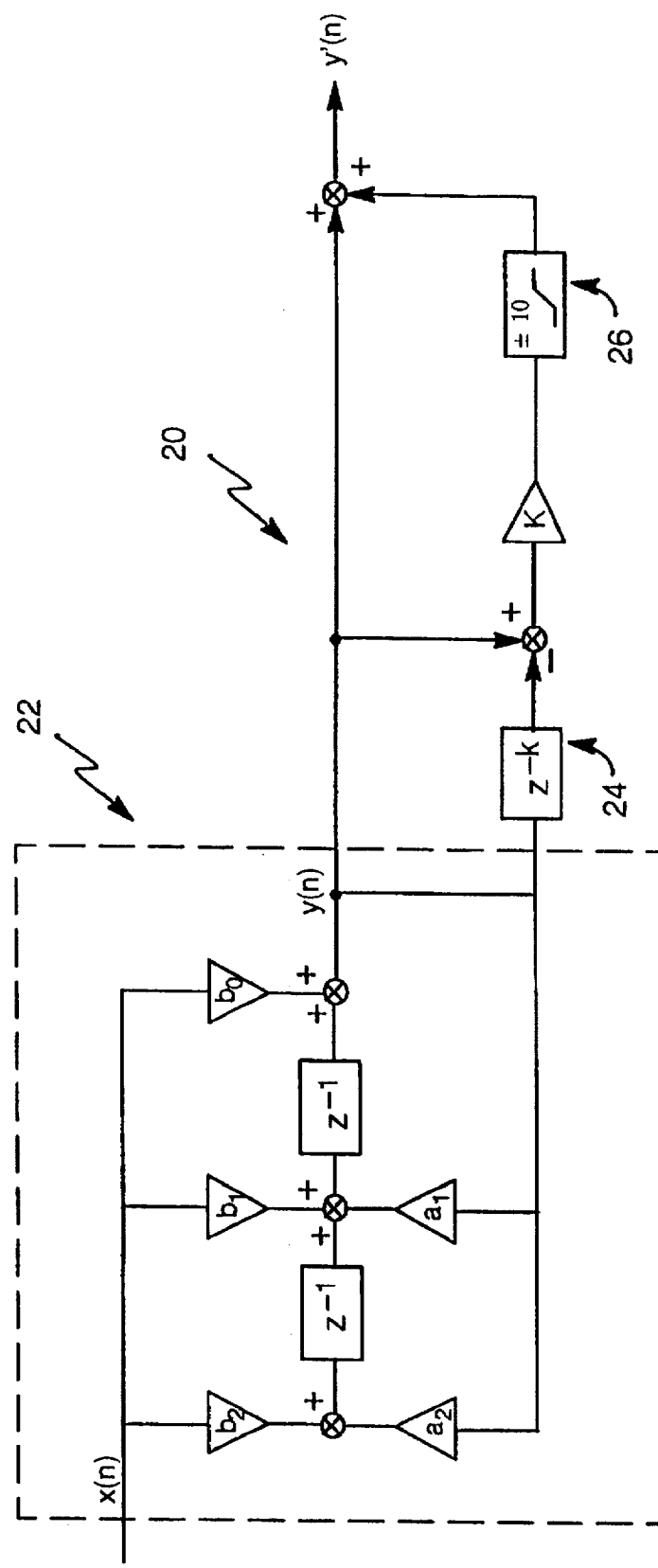
FIG. 3 is a diagram of an airspeed prediction filter in accordance with the present invention.

Nevertheless, a 0.7 second delay in processing time still is not insignificant during the takeoff roll of the aircraft. Consequently, in accordance with the present invention, a correction factor is added to the calculated airspeed y(n) to obtain the displayed airspeed value y'(n). In general, the correction factor is obtained by estimating the rate of change of the calculated airspeed y(n) over a predetermined period, and multiplying the rate of change by the known delay. In the current preferred embodiment, the rate of change is estimated for a 2-second period (a range of 1 second to 5 seconds or more should provide acceptable results). Thus, k in box 24 of FIG. 3 is 40, because at the sampling rate of 20 Hz a 40-sample delay will equal 2 seconds. The calculated airspeed for the 40th preceding sample y(n−40) is subtracted from the current calculated airspeed y(n). This value is multiplied by the value K which is determined from the following equation:

$$K = \frac{r}{2.0} \quad (3)$$

where r is the known processing delay. The denominator represents the period over which the rate of change is measured. In the current embodiment, the known processing delay is 0.7 second. Some of this delay occurs in the air data computer itself, and some of it occurs "downstream" in the display computer 16. The effect of the present invention is to add on to the calculated airspeed y(n) an amount based on the past acceleration. In the preferred embodiment, linear rate of change over the preceding two-second period is assumed using only the current value y(n) and the value y(n−40) calculated two seconds earlier. Calculated values can be stored in a continuously updated buffer. At that rate of change, the correction factor is calculated for the known total processing delay, 0.7 second in the illustrated embodiment. As represented by box 26 in FIG. 3, the maximum value of the correction factor is limited. In the preferred embodiment, the correction factor can be no more than ±10 knots, because this represents the maximum possible correction during normal operation of the aircraft.

Figure 1:
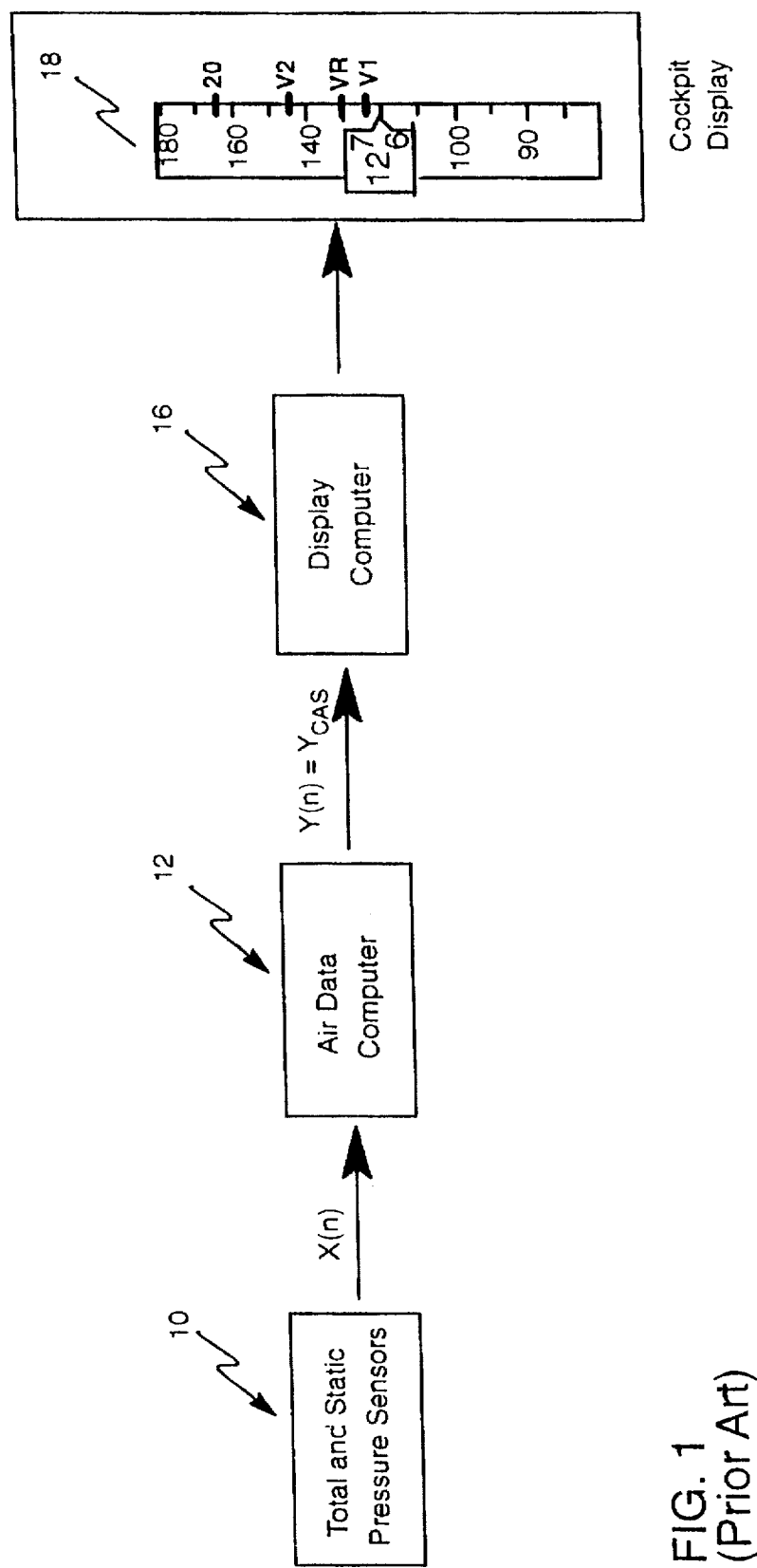
FIG. 1 is a block diagram of a modem airspeed indication system using computer avionics.
Figure 2:
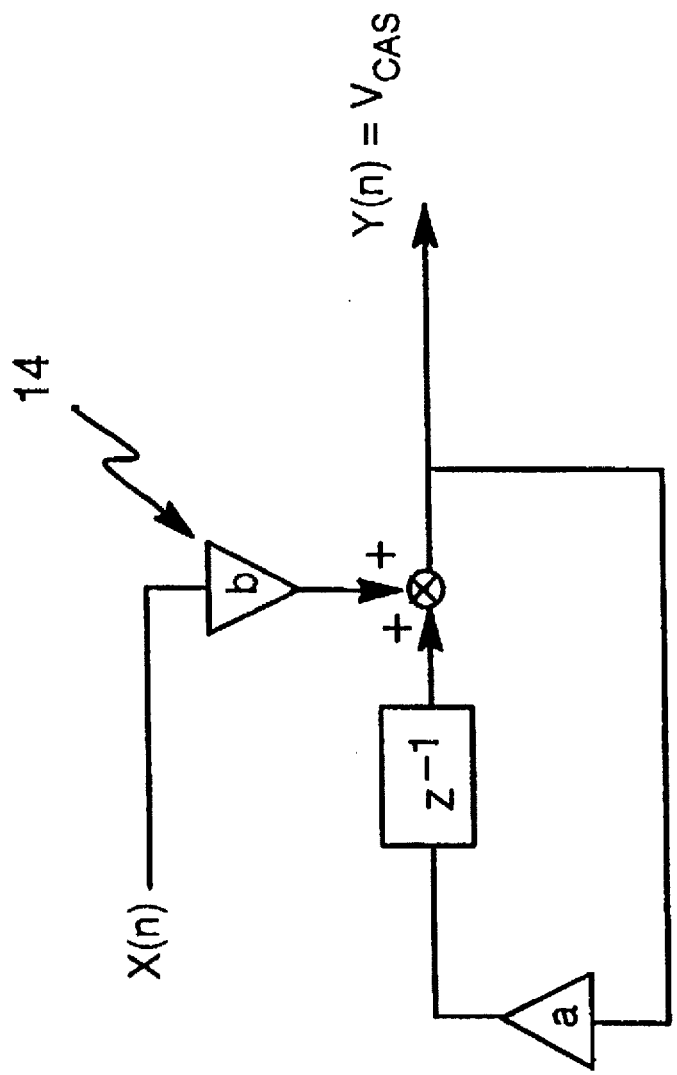
FIG. 2 is a diagram of a filter used in a prior art avionics system.
Figure 4:
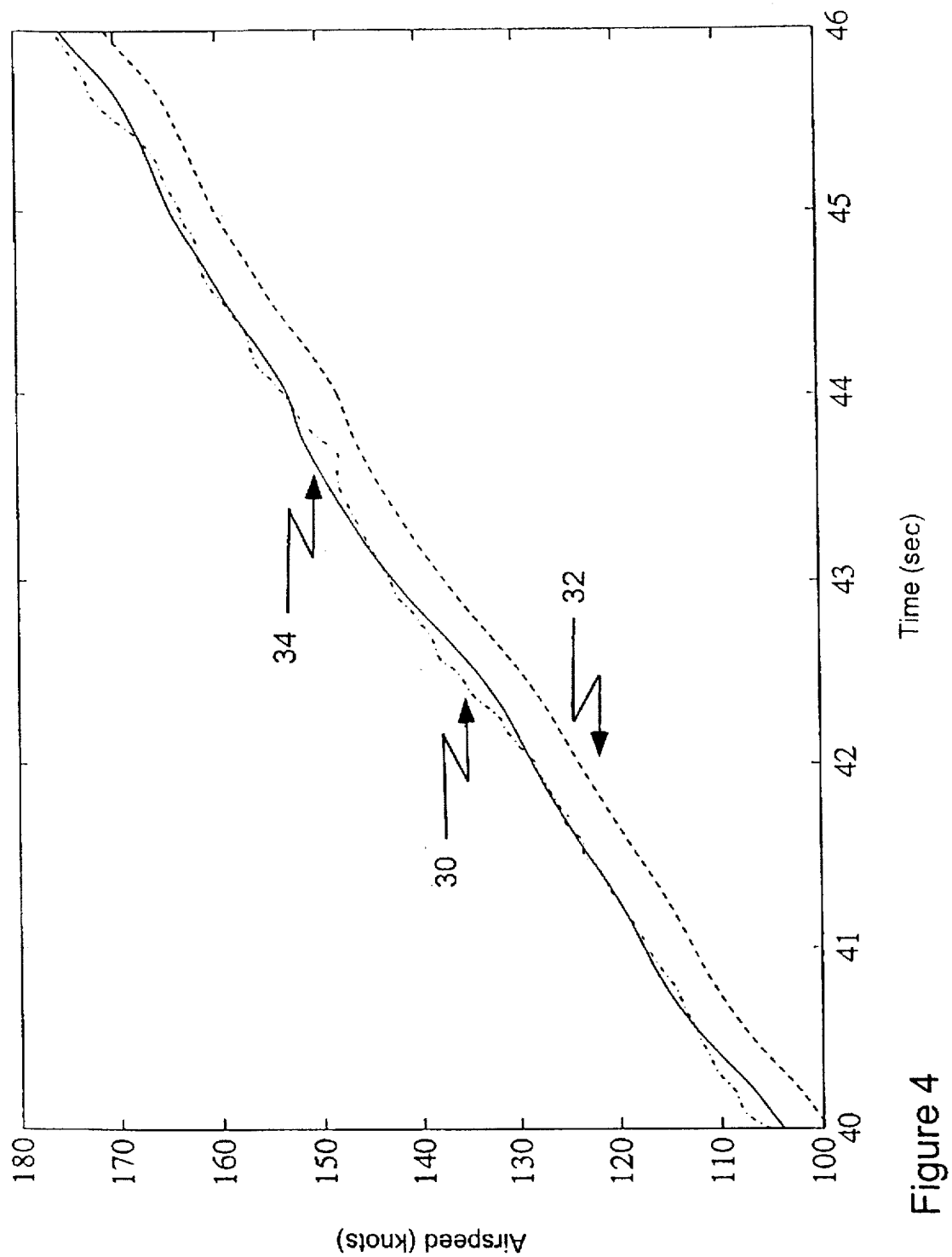
FIG. 4 is a graph illustrating actual airspeed during a takeoff roll, airspeed as displayed by a typical computerized electronic display system, and airspeed as displayed by a system using an airspeed prediction filter in accordance with the present invention.

FIG. 4 illustrates the results of actual testing of the preferred filter in accordance with the present invention for the takeoff roll of a Boeing 777-200 aircraft. Line 30 illustrates the actual airspeed as indicated by the data stream x(n) from the air data computer. For current displays, the rapid fluctuations ("jitter") are unacceptable and must be smoothed. Line 32 represents the delayed, smoothed airspeed achieved by use of a filter of the type shown in FIG. 2. Not only is line 32 smoother, but it is shifted to the right relative to line 30 because of the processing delay.

Line 34 shows the output of the airspeed prediction filter in accordance with the present invention. The close correspondence to actual airspeed, but with the required smoothing, is apparent. No "performance penalty" is required for safe operation of the aircraft.

An advantage of the preferred embodiment of the present invention is that existing computerized avionics can be updated by software changes, and such software changes affect only the airspeed signal processing and do not require other flight parameters to be used in the change. Other possible embodiments might involve other flight parameters such as groundspeed or forward acceleration. For example, on the Boeing 777-200, the existing Air Data Inertial Reference Unit (ADIRU) provides an output of both ground speed and longitudinal acceleration used in other aspects of the avionics systems. Either the acceleration output or ground speed output could be used to compute the correction factor.

Figure 5:
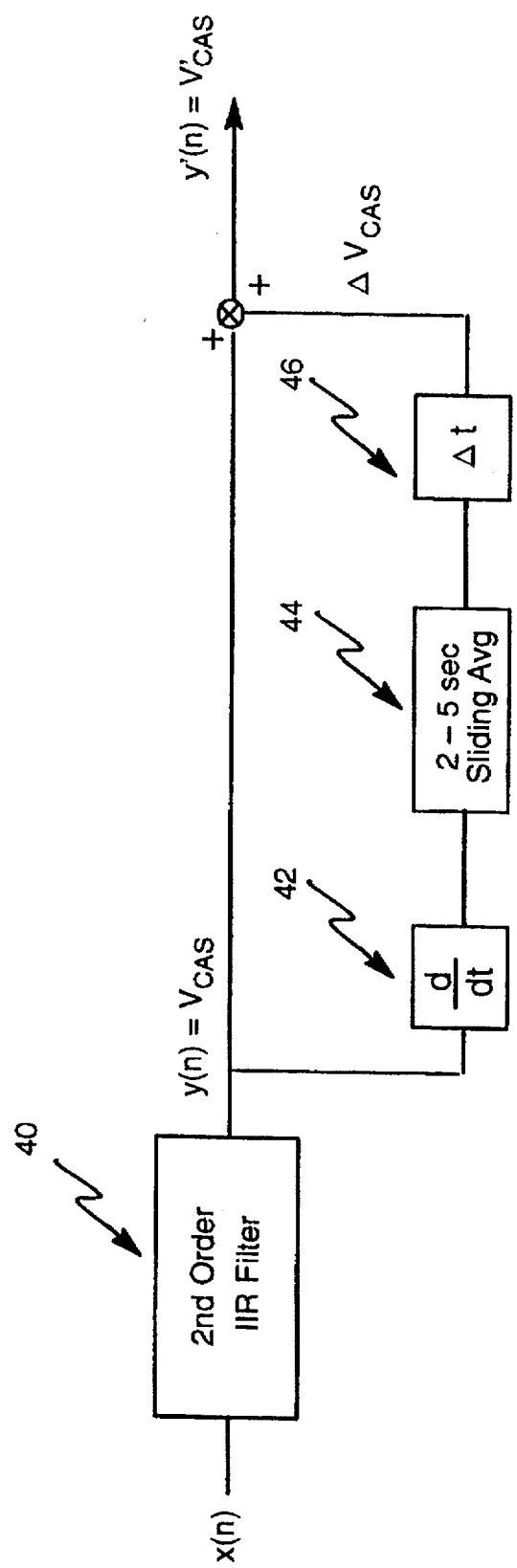
FIG. 5 is a block diagram of the preferred airspeed prediction filter in accordance with the present invention.

More specifically, FIG. 5 is a different representation of the preferred embodiment where the incoming airspeed data x(n) are filtered (block 40). The filtered data y(n)=$V_{CAS}$ is used to compute the correction factor $\Delta V_{CAS}$ by measuring the rate of change over a preceding period (blocks 42 and 44) and multiplying by the known delay $\Delta t$ (block 46). In the embodiment shown in FIG. 6, the correction factor $\Delta V_{CAS}$ is computed in a similar manner based on the incoming ground speed signal $V_{GND}$. Again, the rate of change is measured over a preceding period (blocks 52 and 54) and multiplied by the known delay (block 56). In the embodiment shown in FIG. 7, the correction factor $\Delta V_{CAS}$ is computed from the acceleration data a(n) over a preceding period (block 60) and multiplied by the known delay $\Delta t$ (block 62), then added to the filtered airspeed signal.

Figure 6:
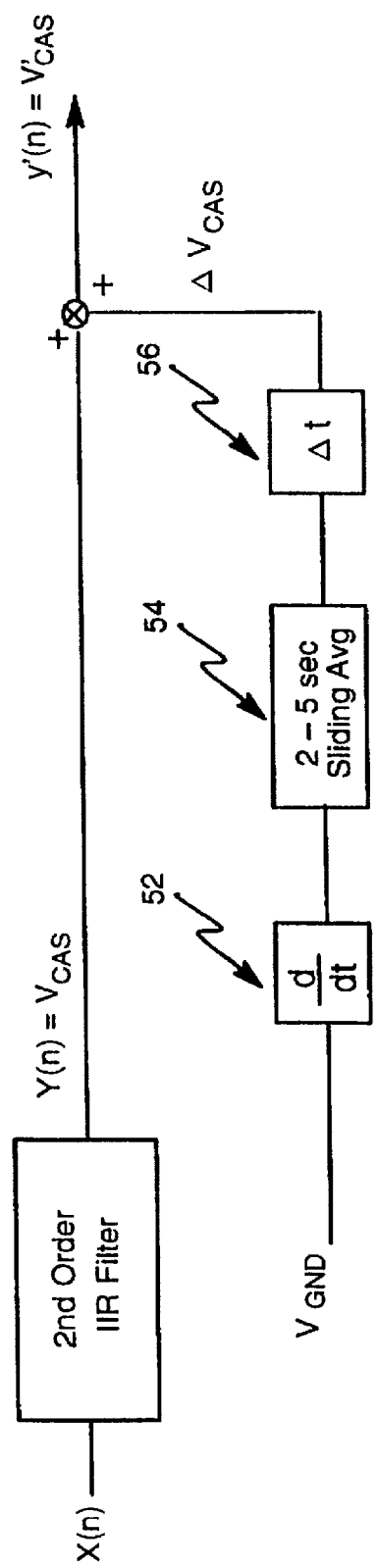
FIG. 6 is a block diagram of another embodiment of airspeed prediction filter in accordance with the present invention.
Figure 7:
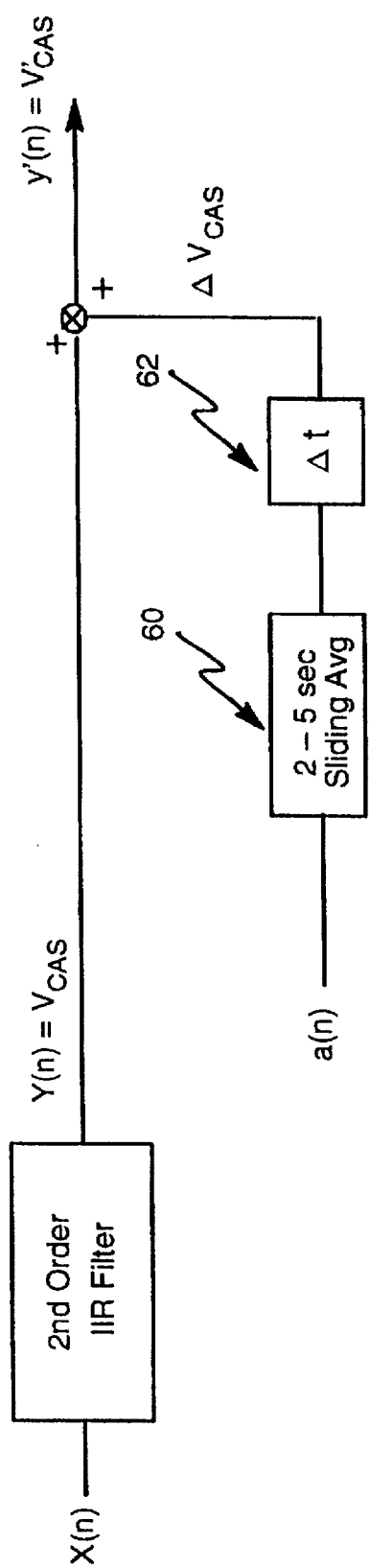
FIG. 7 is a block diagram of another airspeed prediction filter in accordance with the present invention.

However, in the FIG. 6 and 7 embodiments, one critical variable would be used to compute another, so that accuracy of the displayed airspeed would necessarily rely on two critical variables instead of one. In addition, using acceleration or ground speed to compute the correction factor could cause errors in the case of wind shear in the form of a sudden tail wind. In that case, ground speed would increase while airspeed actually is decreasing, and a less accurate indication could be given to the pilot. In prior art systems, there is the same delay for a wind shear situation as there is for the more usual, essentially constant acceleration. By use of the present invention, reduced airspeed is indicated promptly after a short "overshoot."

Figure 8:
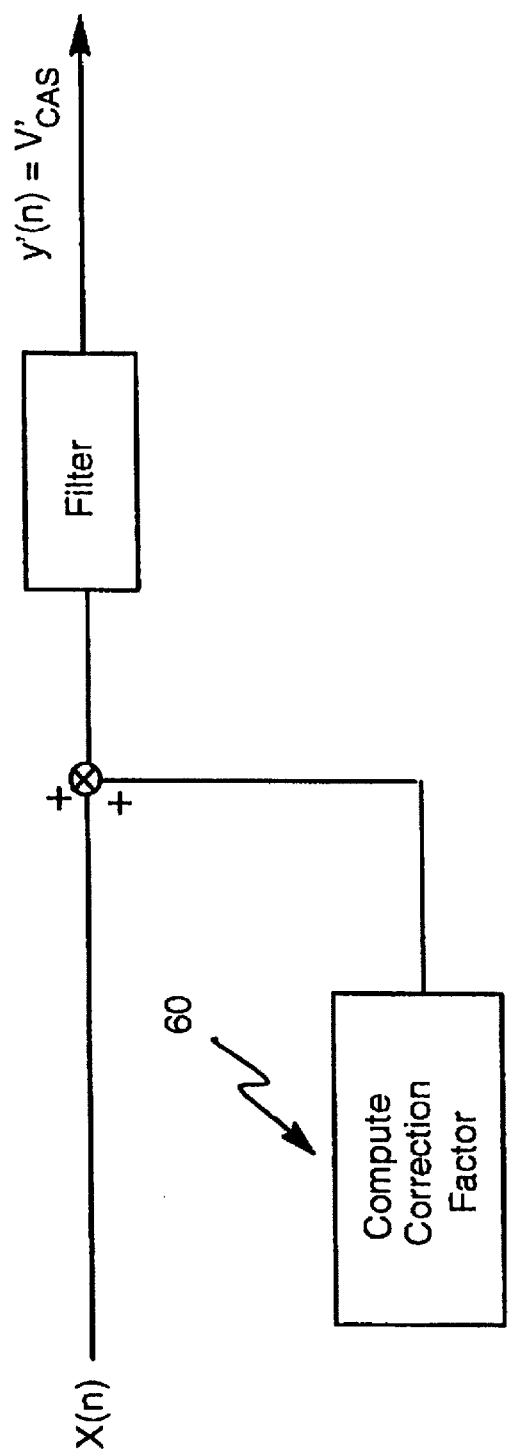
FIG. 8 is a block diagram of still another embodiment of an airspeed prediction filter in accordance with the present invention.

Another possibility, represented in FIG. 8, is to compute the correction factor (block 60) and add it to the airspeed data x(n) prior to filtering. Again, the correction factor can be computed by calculating the rate of change over a preceding period and multiplying by the known delay. The correction factor then is added to the airspeed data stream x(n), prior to filtering the data to remove the high frequency component that would cause an acceptable display jitter. The FIG. 3 embodiment is preferred over the approach shown in FIG. 8 because it is believed the most accurate indication is obtained when the high frequency component of the incoming data x(n) is removed (i.e., the data is smoothed) prior to calculating the rate of change.

Consequently, advantages of the preferred embodiment of the present invention include the following:

1. the system fully corrects displayed airspeed error due to the known lag from probe to display;

2. the system uses only the current calibrated airspeed parameter, which is beneficial to maintaining system integrity, reduce implementation costs, and ensure that additional airspeed errors are not introduced from another source;

3. the system is not only accurate, but the output is filtered sufficiently to be jitter-free and easily readable when displayed to the pilot; and 4. the system requires only software changes that can be implemented and retrofitted on all commercial aircraft with airspeed errors of this type.

Figure 9:
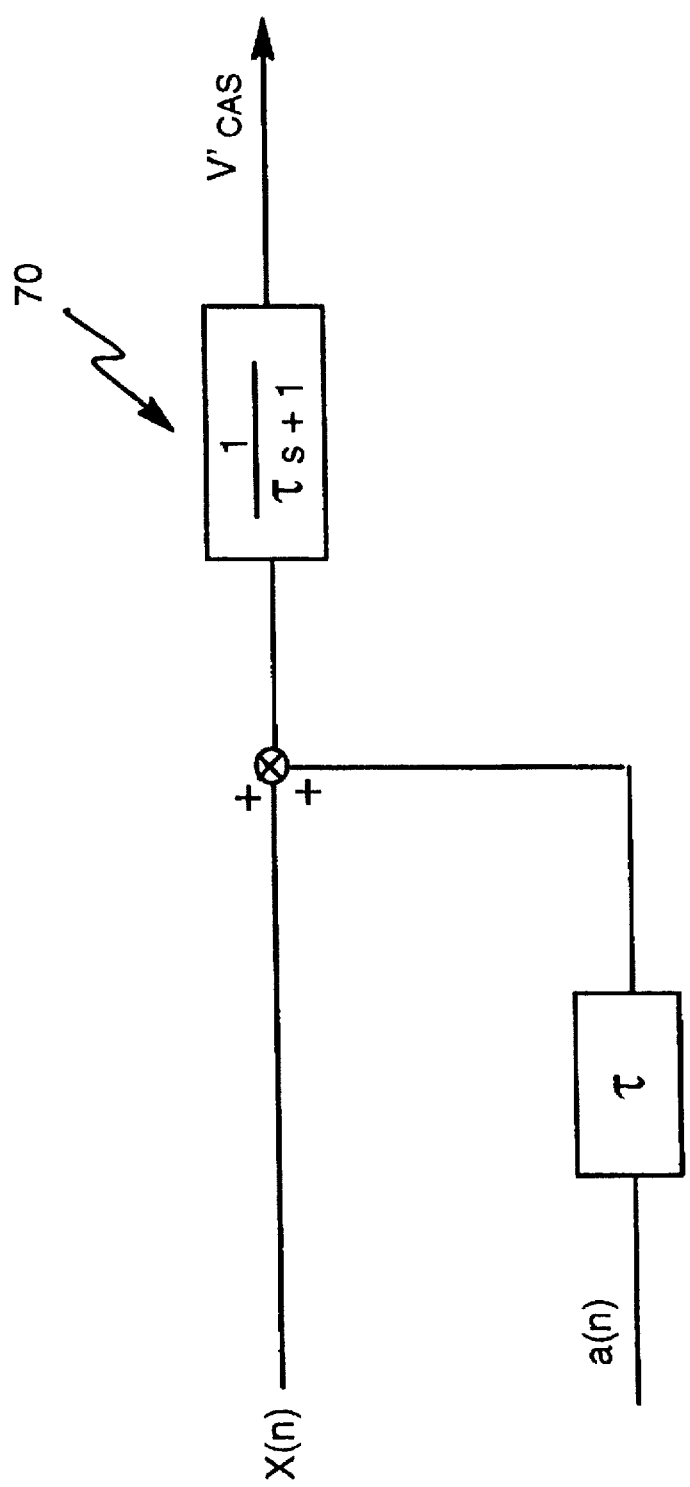
FIG. 9 is a block diagram of yet another embodiment of an airspeed prediction filter in accordance with the present invention.

Another variation is depicted in FIG. 9. This embodiment uses a linear complementary filter implementation. The airspeed signal x(n) from the air data computer is passed through a first-order low-pass filter 70, which may have the same digital implementation described with reference to FIG. 2. The filter removes the unwanted high-frequency jitter from the airspeed. To complement the smoothed (and delayed) signal, the high-frequency component removed from the airspeed signal is replaced by inertial forward acceleration multiplied by the filter time constant. The acceleration, because it is inertial based, does not reintroduce air turbulence noise (jitter), but restores the high-frequency information and eliminates the time delay.

While the preferred embodiment of the invention has been illustrated and described, it will be apparent that various changes can be made therein without departing from the spirit and scope of the invention.

The embodiments of the invention in which an exclusive property or privilege is claimed are defined as follows:

1. In a method of displaying the airspeed of an aircraft to a pilot, which method includes:

measuring the airspeed of the aircraft;

generating a data stream indicative of measured airspeed; and using the data stream to control a cockpit display of airspeed, wherein a delay occurs between measurement and cockpit display of the airspeed;

the improvement which comprises:

calculating a correction factor indicating a predicted change in the airspeed of the aircraft during the delay;

combining the correction factor with the data stream of measured airspeed to obtain a signal of the predicted airspeed of the aircraft at the time of the display; and using the combined signal to display the predicted airspeed to the pilot.

2. In the method defined in claim 1, filtering the data stream indicative of measured airspeed prior to combining the data stream with the correction factor.

3. In the method defined in claim 1, filtering the data stream indicative of measured airspeed with a second order infinite input response filter prior to combining the data stream with the correction factor.

4. In the method defined in claim 1, calculating the correction factor based solely on the rate of change of measured airspeed as indicated by the data stream.

5. In the method defined in claim 1, calculating the correction factor based on a measurement of acceleration of the aircraft.

6. In the method defined in claim 1, calculating the correction factor based on a measurement of ground speed of the aircraft.

7. In the method defined in claim 1, calculating the correction factor based solely on a measurement of airspeed of the aircraft.

8. In the method defined in claim 7, calculating the correction factor by comparing the measured airspeed at one instant with the measured airspeed a predetermined interval earlier, calculating the average rate of change of measured airspeed during that interval, and multiplying the calculated average rate of change by the delay, such that the correction factor indicates the predicted change in the airspeed of the aircraft.

9. In a method of displaying the airspeed of an aircraft to a pilot, which method includes measuring the airspeed of the aircraft, generating a data stream indicative of measured airspeed, and using the data stream to control a cockpit display of airspeed, wherein a delay occurs between measurement and cockpit display of the airspeed, the improvement which comprises filtering the data stream by a second order infinite input response filter, calculating the rate of change of airspeed as indicated by the filtered data stream over a predetermined interval, multiplying the calculated rate of change by the delay to obtain a prediction of the change in the airspeed of the aircraft between the time of measurement of the airspeed and the cockpit display, combining the predicted change with the data stream of measured airspeed, and using the combined data stream and predicted change to display the predicted airspeed to the pilot.

* * * * *